(12) United States Patent
Naylor

(10) Patent No.: US 11,220,311 B2
(45) Date of Patent: Jan. 11, 2022

(54) WATERCRAFT AND AIRCRAFT BLADDER AND TIE DOWN SECURING APPARATUSES AND METHODS

(71) Applicant: Cross Pipes Development LLC, Palestine, TX (US)

(72) Inventor: Jason Martus Naylor, Palestine, TX (US)

(73) Assignee: Cross Pipes Development LLC, Palestine, TX (US)

( * ) Notice: Subject to any disclaimer, the term of this patent is extended or adjusted under 35 U.S.C. 154(b) by 19 days.

(21) Appl. No.: 16/786,118

(22) Filed: Feb. 10, 2020

(65) Prior Publication Data

US 2020/0255095 A1   Aug. 13, 2020

Related U.S. Application Data

(60) Provisional application No. 62/803,134, filed on Feb. 8, 2019.

(51) Int. Cl.
| | |
|---|---|
| *B63B 1/10* | (2006.01) |
| *B63B 1/38* | (2006.01) |
| *B63B 1/32* | (2006.01) |
| *B63C 5/04* | (2006.01) |
| *B64F 1/16* | (2006.01) |
| *B63B 1/36* | (2006.01) |
| *B63C 5/02* | (2006.01) |

(52) U.S. Cl.
CPC .................. *B63B 1/38* (2013.01); *B63B 1/10* (2013.01); *B63B 1/322* (2013.01); *B63C 5/04* (2013.01); *B64F 1/16* (2013.01); *B63B 1/36* (2013.01); *B63C 2005/022* (2013.01)

(58) Field of Classification Search
CPC .. B63B 1/38; B63B 1/322; B63B 1/36; B63B 39/00; B63B 1/10; B63C 5/04; B63C 2005/022; B63C 5/02; B64F 1/16
USPC .................................. 114/121, 122, 125, 364
See application file for complete search history.

(56) References Cited

U.S. PATENT DOCUMENTS

| | | | | |
|---|---|---|---|---|
| 3,509,727 | A * | 5/1970 | Zorab ...................... | E02C 1/06 405/6 |
| 4,282,822 | A * | 8/1981 | Jackson ................ | B63B 59/045 114/222 |
| 5,860,379 | A * | 1/1999 | Moody ..................... | B63C 3/06 114/54 |
| 6,029,595 | A * | 2/2000 | Bachmann .............. | B63B 13/00 114/125 |
| 7,421,963 | B1 * | 9/2008 | Victor ...................... | B63C 1/00 114/45 |

(Continued)

*Primary Examiner* — Anthony D Wiest
(74) *Attorney, Agent, or Firm* — Stephens Domnitz Meineke, PLLC; Matthew C. Juren

(57) ABSTRACT

The novel bladder systems and tie down systems set forth herein provide systems and apparatuses that mitigate or prevent damage, such as tipping over/capsizing, of a watercraft stored on shore or an aircraft secured to a ground surface during adverse wind, rising water, or storm events. Further, novel apparatuses and methods for storing a watercraft using the bladders as cushioning or holding devices when installed within a cavity, whether the cavity is created by digging a hole or building an enclosing berm, provides additional stability and security for the watercraft during adverse wind, rising water, or storm events.

19 Claims, 9 Drawing Sheets

(56) References Cited

U.S. PATENT DOCUMENTS

2008/0066670 A1\* 3/2008 Wallach .................... B63C 1/04
114/345
2018/0319469 A1\* 11/2018 Roefaro .................... B63C 1/06

\* cited by examiner

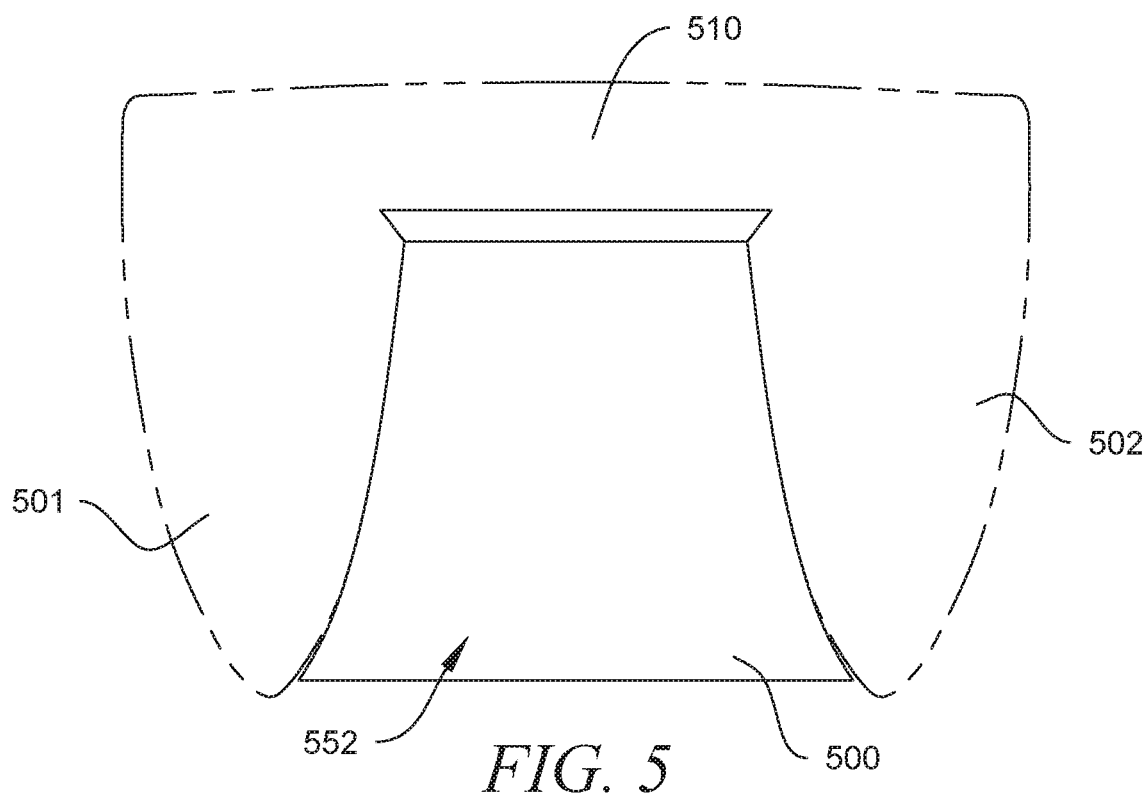
FIG. 5
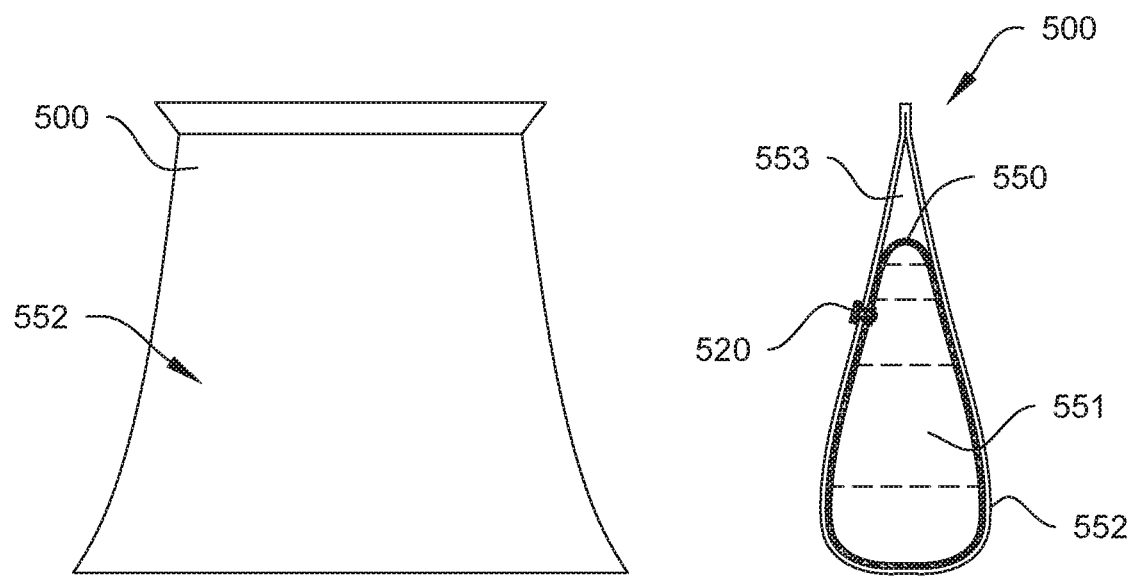
FIG. 6
FIG. 7

WATERCRAFT AND AIRCRAFT BLADDER AND TIE DOWN SECURING APPARATUSES AND METHODS

This application claims benefit to the priority date of U.S. Provisional Application No. 62/803,134 filed on Feb. 8, 2019.

TECHNICAL FIELD

The novel bladder systems and tie down systems set forth herein provide systems and apparatuses that mitigate or prevent damage, such as tipping over/capsizing, of a watercraft stored in the water or on shore or an aircraft parked on a ground surface during adverse wind, rising water, or storm events. Further, novel apparatuses and methods for storing a watercraft using the bladders as cushioning or holding devices when installed within a cavity, whether the cavity is created by digging a hole or building an enclosing berm, provides additional stability and security for the watercraft during adverse wind, rising water, or storm events.

BACKGROUND

Watercraft are highly susceptible to damage during wind storms, such as hurricanes, typhoons, tornados, or the like. Watercraft can also be susceptible to damage caused by storm surges, rapidly rising or receding water, or tsunamis. Watercraft owners and insurance policy companies are acutely aware of the potential for damages or complete losses of watercraft that can occur during and after wind storms. This was recently experienced during the 2017 North American hurricane season with significant losses caused by Hurricanes Harvey, Irma, and Maria. Significant property losses were incurred with the partial and total losses of numerous watercraft stored according to local and best prior practices. It is imperative to mitigate and minimize the potential damage and loss of watercraft from these types of storms by preparing and securing watercraft or aircraft before the wind storm impacts the location of the watercraft or aircraft.

Similarly, aircraft are also susceptible to damage during adverse wind conditions when parked or stored on a runway, taxiway, airport apron, offsite, or unimproved airfield. Depending on the severity of the adverse wind conditions aircraft can be lifted from the ground and drift into objects, such as other aircraft, buildings, or trees. Significant damage or the total loss of the aircraft can be incurred by such movement caused by the adverse wind conditions.

Prior practices varied depending on whether the watercraft would be left in the water or brought ashore before the impact of the wind storm. If the watercraft would be left in the water, it could be berthed at a stationary dock or a floating dock with sufficiently tall pilings. Other methods of preparing a watercraft for water based storage during a wind storm include the use of "hurricane pits," wherein these hurricane pits are deep, narrow coves or inlets surround by a plurality of sturdy trees or wind barriers that also act as tie-off anchor points. If the watercraft was to be brought on-shore, the watercraft could be situated on top of stilts and tied down to anchor points, such as trees, rocks, eyelet stakes installed on a concrete slab, directly into the ground, or the like. Another on-shore method could include storing the watercraft in an elevated dry rack. Certainly, whether leaving a watercraft in the water or bringing it ashore, watercraft must also be prepared and secured before a windstorm by removing any items, such as sails, masts, and other objects that can be torn loose by strong winds.

Smaller aircraft could preferably be flown away from the anticipated path of an adverse wind storm or stowed in a garage before the wind storm occurs; however, garages or parking spaces may not be available at some airports, offsite locations, unimproved airfields, or remote landing fields. There is a need to provide for a portable system to secure aircraft, such as small general aviation aircraft, through the use of a tie down and bladder apparatus and method described herein.

SUMMARY OF INVENTION

The present invention provides novel apparatuses and methods to more securely and safely store watercraft in preparation for a wind storm. The present invention may use a plurality of inflatable bladders, filled with a gas or liquid, which provides a cradle for the hull or hulls of a watercraft. Further embodiments, include installing the bladders around the interior perimeter of a preformed cavity and then placing the watercraft into the cavity and resting on top of the installed bladders and anchoring the watercraft with specific bungee type anchor points around the hole. Additional and further embodiments, include installing the bladders into a preformed cavity made by a built-up surrounding berm and then anchoring the watercraft with anchors points around or on the berm. The use of the apparatus and methods described herein are believed to be the new best practices associated with storing watercraft and aircraft in preparation for wind storms or other adverse weather conditions. Further, the present invention provides novel apparatuses and methods for securing aircraft in preparation of a wind storm or other adverse weather conditions.

BRIEF DESCRIPTION OF DRAWINGS

FIG. 5 is a depiction of an embodiment of the multi-hull watercraft bladder apparatus.

FIG. 6 is an alternative embodiment depiction of the multi-hull watercraft bladder apparatus.

FIG. 7 is an cut-away side profile depiction of the multi-hull watercraft bladder apparatus.

DESCRIPTION OF EMBODIMENTS

Figure 1A:
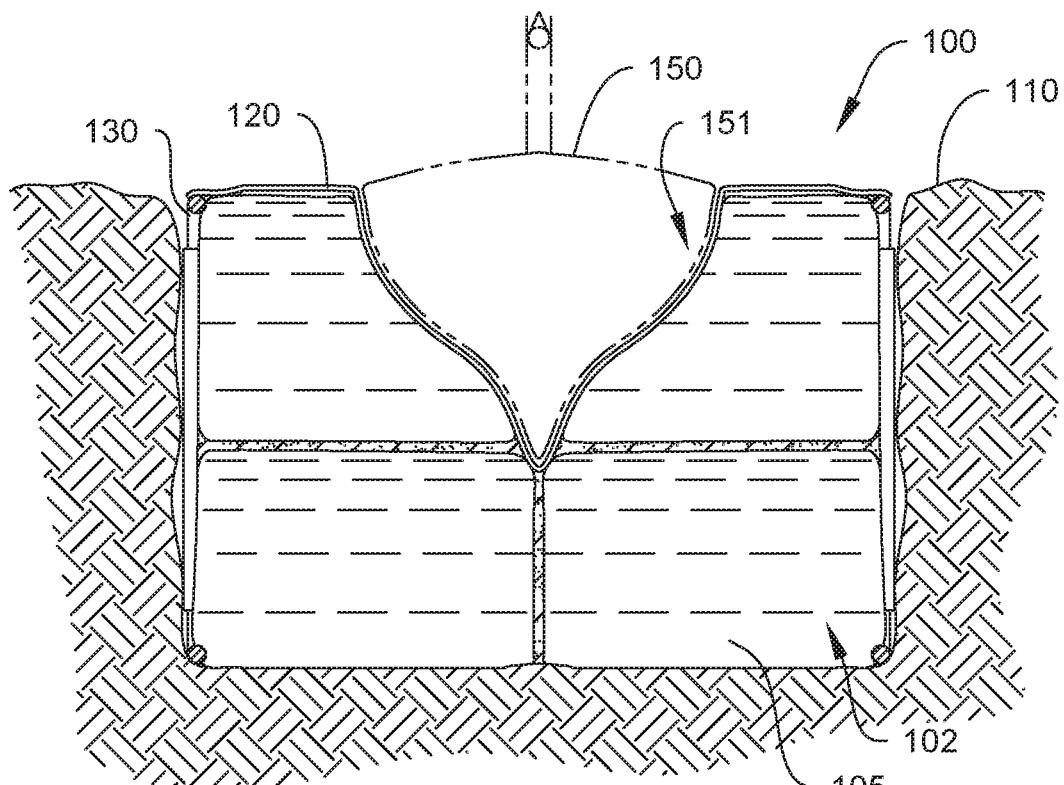
FIG. 1A is a depiction of the mono-hull watercraft bladder apparatus from the front.
Figure 1B:
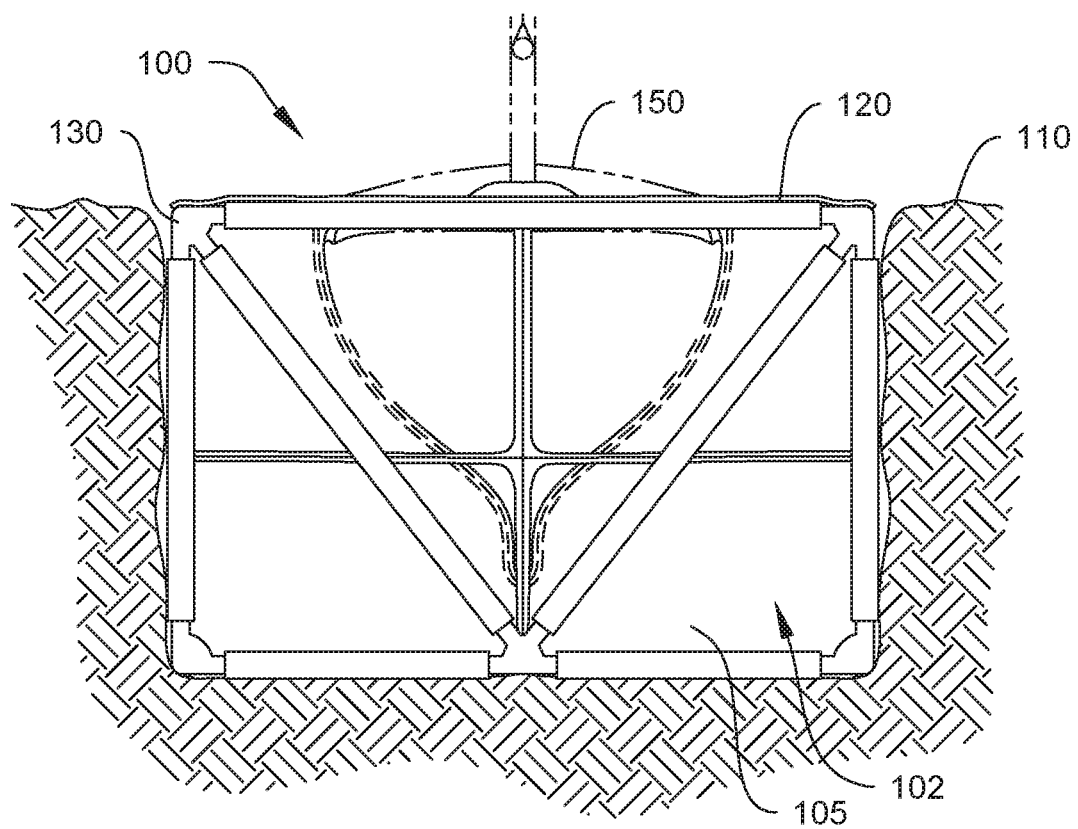
FIG. 1B is a depiction of the mono-hull watercraft bladder apparatus from the rear including the structural support frame.
Figure 2:
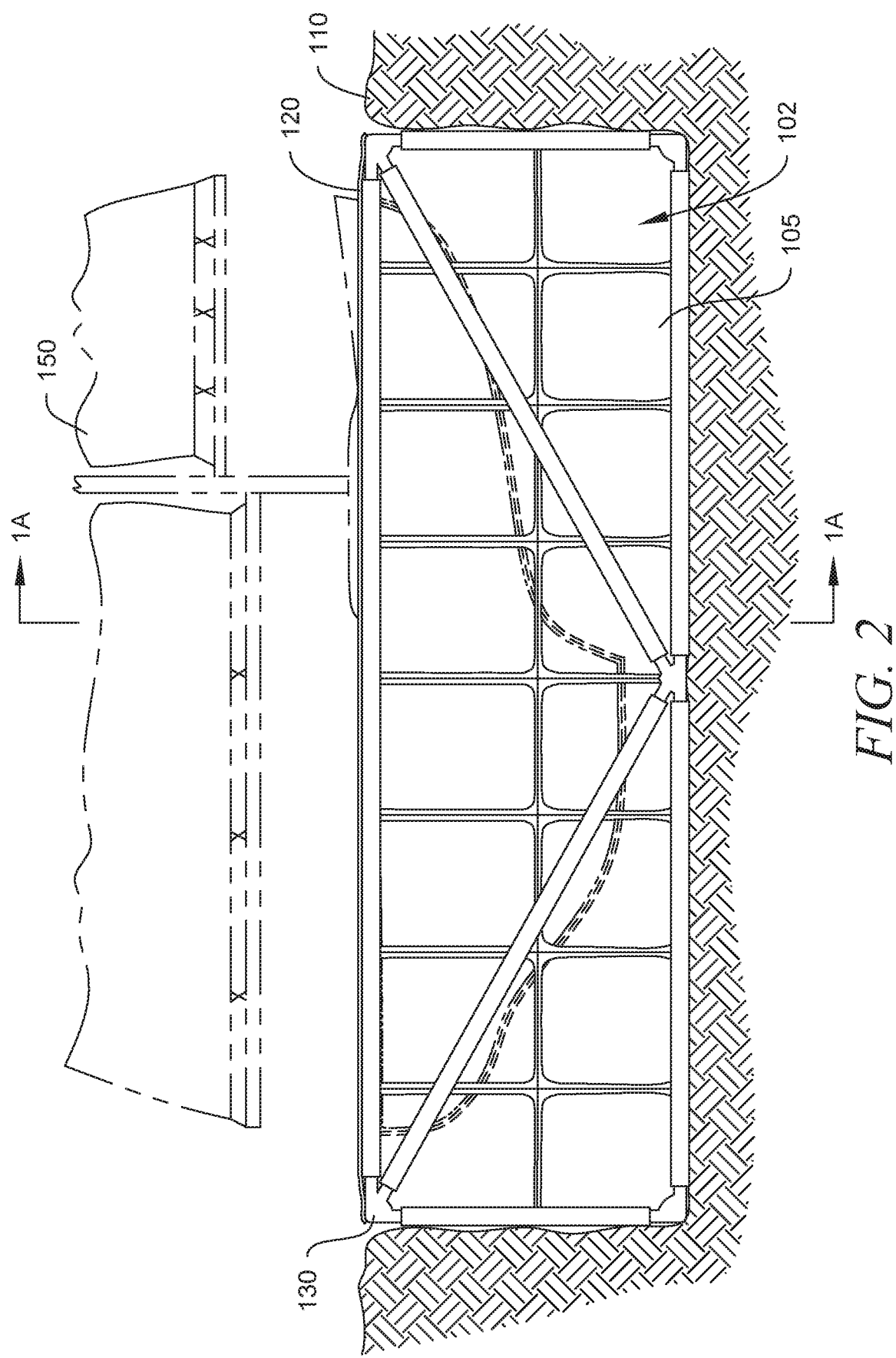
FIG. 2 is a side profile depiction of the mono-hull watercraft bladder apparatus.
Figure 3:
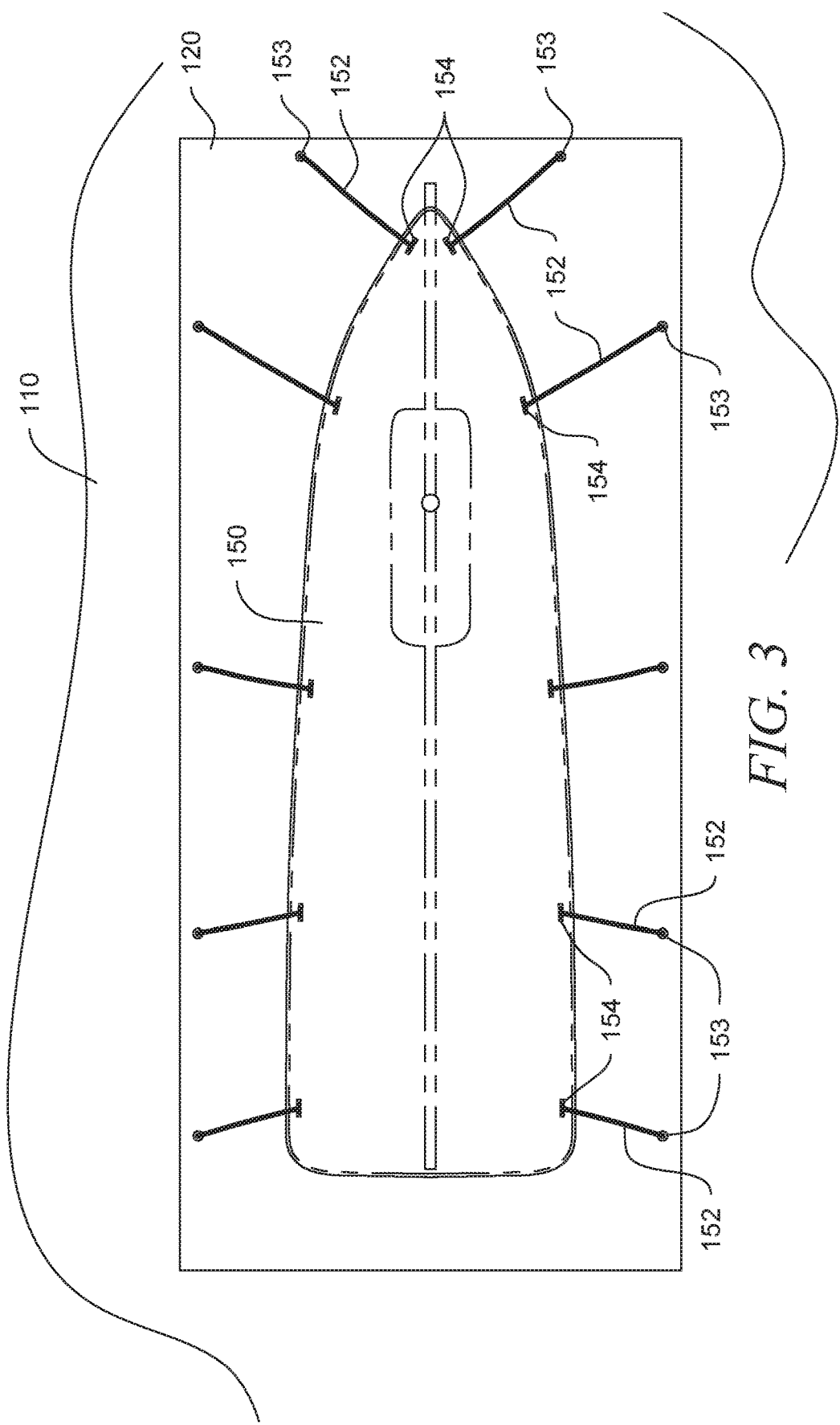
FIG. 3 is a top-down depiction of the mono-hull watercraft bladder apparatus.
Figure 4:
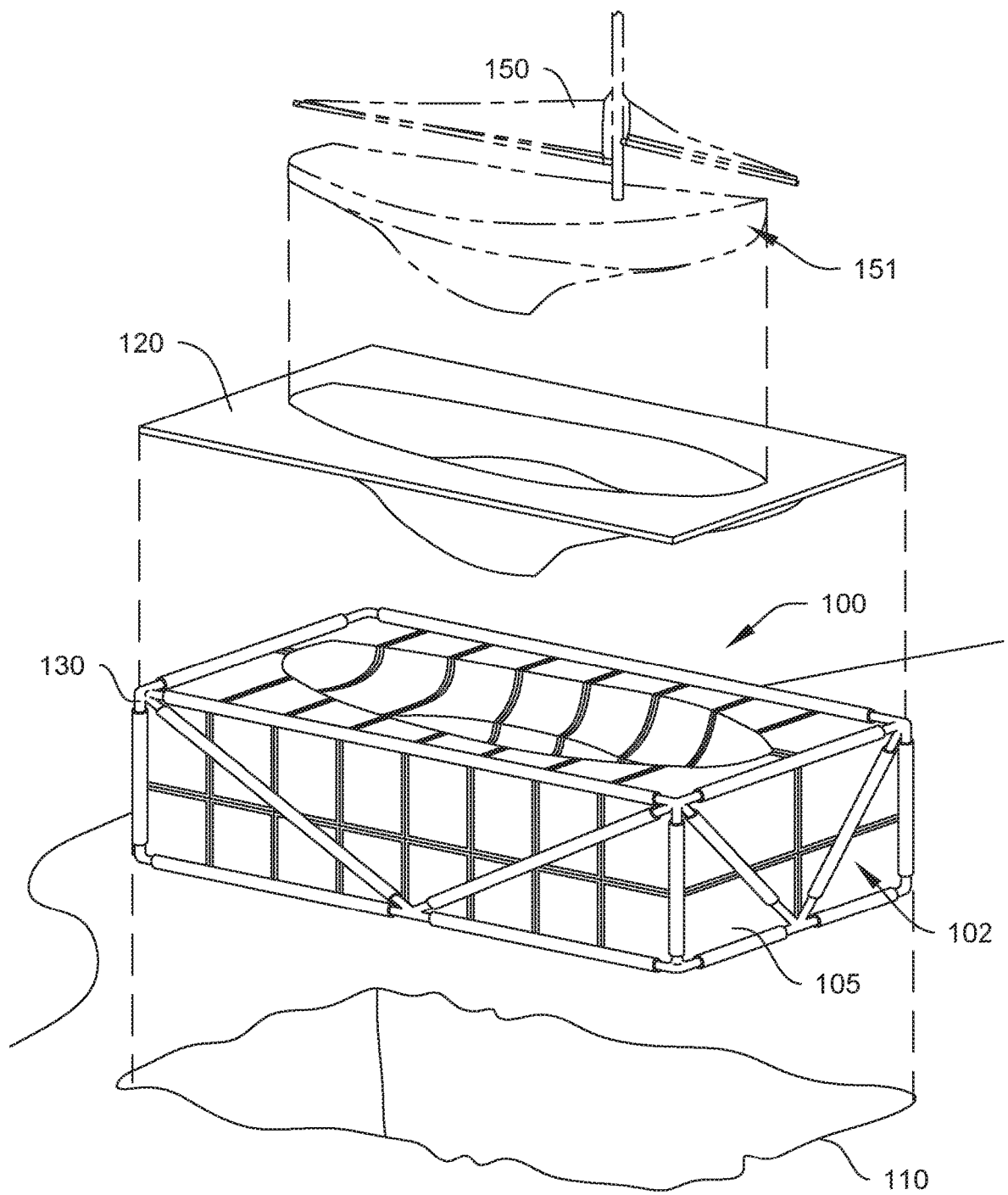
FIG. 4 is an isometric depiction of a mono-hull watercraft bladder apparatus and method of use.
Figure 8A:
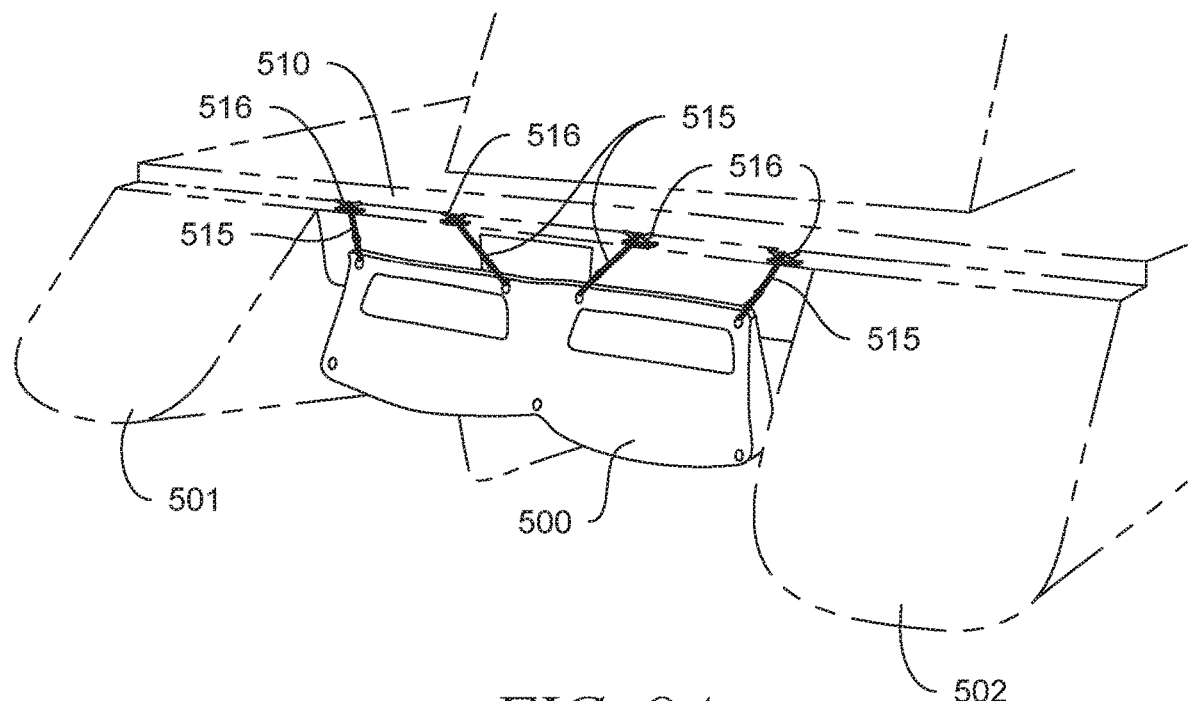
FIG. 8A is an alternative embodiment depiction of the multi-hull watercraft bladder apparatus.
Figure 8B:
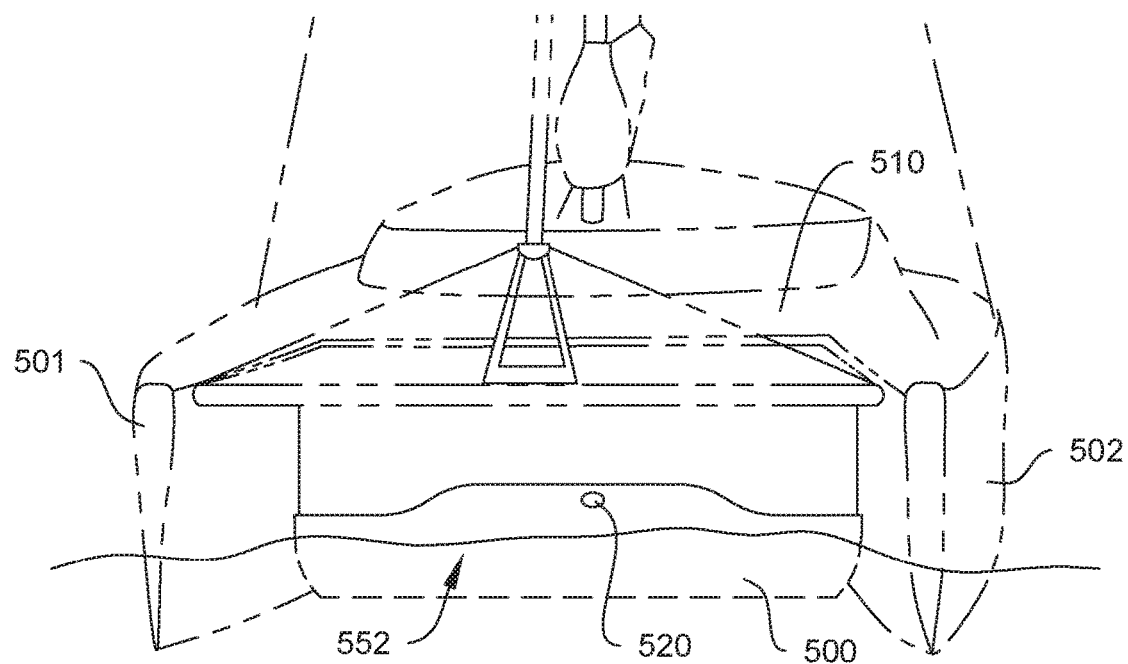
FIG. 8B is an alternative embodiment depiction of the multi-hull watercraft bladder apparatus.
Figure 9A:
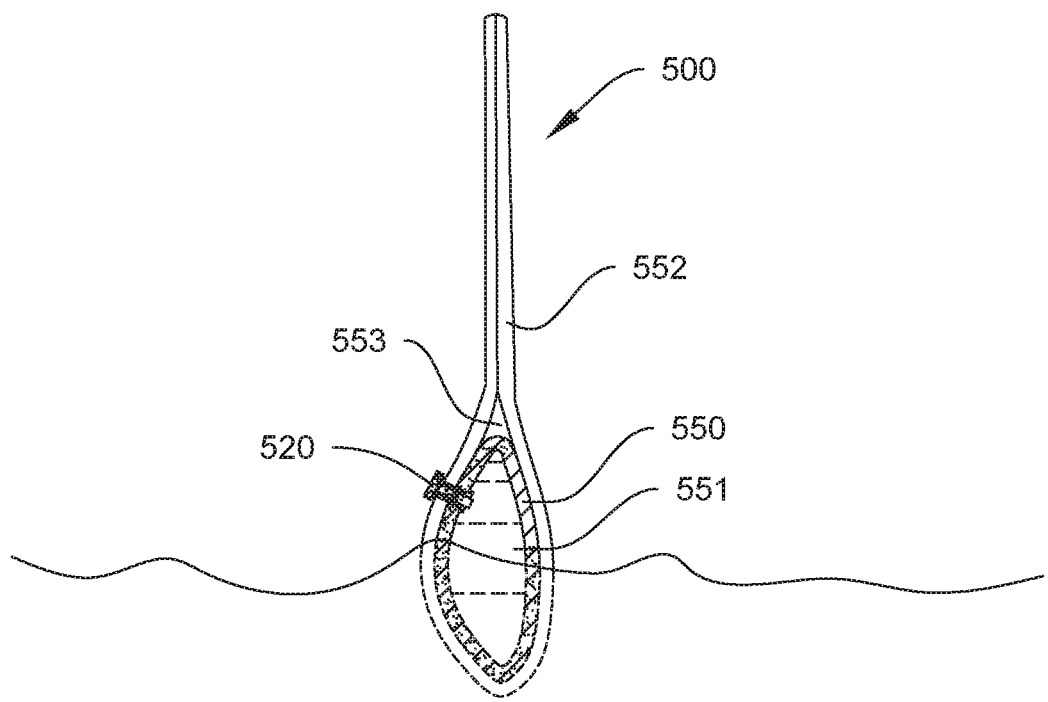
FIG. 9A is an alternative cut-away side profile depiction of the multi-hull watercraft bladder apparatus.
Figure 9B:
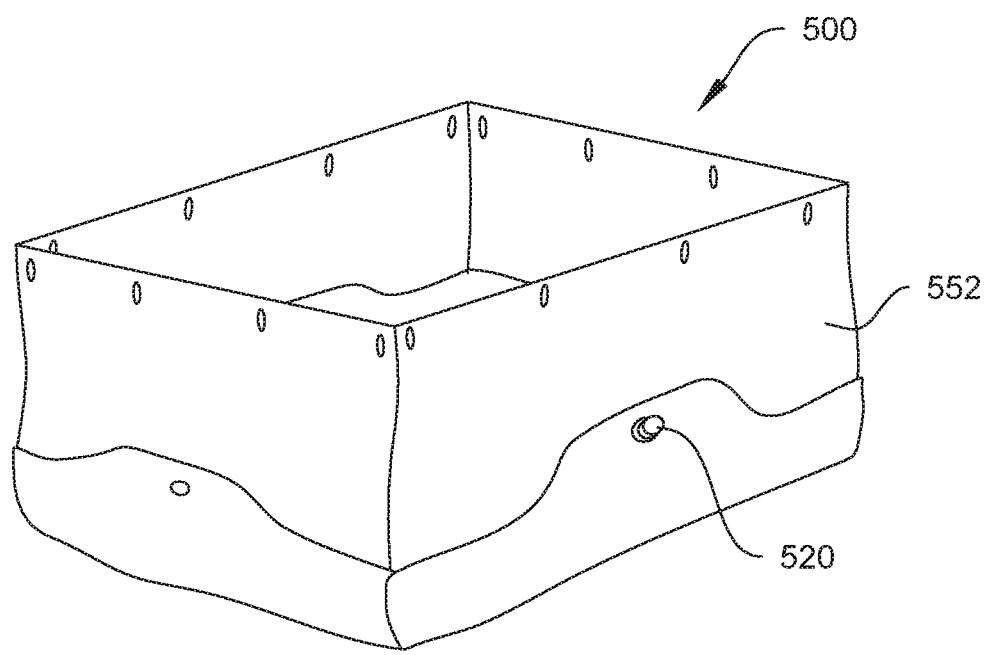
FIG. 9B is an alternative isometric depiction of the multi-hull watercraft bladder apparatus.

Mono-Hull Watercraft Bladder Apparatus and Securing Method

FIGS. 1A, 1B, 2, 3, and 4 provide examples of the described bladder system providing a novel storage method for mono-hull boats during windstorms and other severe weather conditions. Preferably, the bladder apparatus 100 is used and installed along the interior portion of a pre-dug hole or cavity or pit 110. Additionally, the bladder apparatus may comprise a rigid frame or lattice 130 to support the bladders, watercraft, and/or walls forming the pre-dug hole, cavity, or pit. The bladder apparatus can comprise an outer sleeve or cover 102 that can be made of a tough and durable material such as Kevlar or spectra fiber fabrics forming an internal chamber 105 wherein individual bladders, multi-chamber bladders, or baffled bladders can be installed. The bladder preferably includes a valve or flap to allow an opening to the interior of the bladder so that materials may be installed inside the bladder. The internal bladders can be filled with water, or other liquid, or other available materials, such as rocks, pebbles, sand, concrete bags. The boat 150 is then lowered into the hole or cavity to rest on top of the bladder apparatus. The bladders can be further filled to provide additional support. The bladder system preferably includes the use of a padded liner 120 between the bladder and the watercraft to prevent rubbing damage. This can be in the form of an outer sleeve 102 encapsulating the bladder or a sheet or tarp that covers the individual bladders or that is large enough to provide coverage of the bottom surface 151 of the boat's hull. The bladders 105 or the outer sleeves 102 containing the bladders can be affixed with eyelets, rings, or attachment points or devices 153 that can be used to secure the bladders to the ground or other surface via auger bits and straps to prevent the bladders from floating during rising water events. The watercraft 150 can then be further secured through a set of bungees 152 that are attached at one point to the bladders 153 and attach at multiple points 154 to the watercraft 150. This bungee system allows the watercraft to rise during a rising water event, float, and return back to the original resting position once the water recedes. The bungee system is believed to provide the additional benefit of preventing water from entering the cabin or interior compartments of the watercraft during the rising water event.

It is believed that these apparatuses and systems will solve the problem recently seen in the British Virgin Islands after Hurricane Maria. Many mono-hull boats were kept in an antiquated manner such as on jack stands, at significant heights, and tied to the ground. The wind and rising water events associated with Hurricane Maria caused massive losses of watercraft due to capsizing, tipping over, and unintended movement of the watercraft from prior storage and securing practices. The damages and losses incurred by owners, operators and insurance companies exceeded millions of dollars just for mono-hull water craft, which could have been mitigated or avoid with the use of the bladder system, apparatuses, and methods described herein.

The preferred embodiment of the mono-hull watercraft bladder apparatus and securing method is preferably provided in a portable "kit" system, such as allowing the entire bladder apparatus to be stowed in a suitcase, duffel bag, or chest. Such a portable bladder apparatus system would allow for convenient and quick portability, ready storage and carrying options, and allow the watercraft operator to transport the system within the watercraft passenger compartment or storage compartments. The ready portability and storage of the bladder apparatus system can also allow dock and port operators and owners to have reserve bladder apparatus systems available to loan, sell, or give to watercraft operators that may require the use of such systems. The portability of the bladder apparatus system also allows for purchasers of the system to receive the system via ordinary parcel or freight delivery services. The portable kit system would preferably include one or more bladders; one or more removable bladder sheaths; tie down augers or stakes; tie down straps or ropes; an electric pump; a manual hand pump; and a storage backpack, duffel, or chest.

Another benefit provided through the described bladder system, is if fresh water is used to fill a bladder it may also be reused as a potable water source after the adverse weather event, where access to fresh water may be limited or unavailable.

It should be appreciated that the mono-hull watercraft bladder apparatus can come in various sizes and shapes to allow for the watercraft operators to use a bladder system that provides an appropriate fit for the watercraft or the cavity into which the bladder system is being installed.

Multi-Hull Bladder Apparatus and Securing Method

With reference to FIGS. 5, 6, 7, 8A, 8B, 9A, and 9B, the present embodiment is intended for a multi-hull watercraft bladder system 500 that can extend from one hull 501 to a second hull 502 on a catamaran, or other multi-hull watercraft, spanning underneath the saloon or deck area 510. The multi-hull bladder system 500 is provided to strap via padded strapping 515 in multiple points 516 to the hull and saloon area 510 of the multi-hull watercraft. A single bladder, a single bladder with multiple compartments/baffles, or a series of two or more bladders 550 may be used in various configurations to fill the area formed under the saloon and between the hulls of the multi-hull watercraft. The bladder 550 preferably includes a valve 520 or flap to allow an opening to the interior 551 of the bladder so that materials may be installed inside the bladder. The bladder apparatus 500 can comprise an outer sleeve or cover 552 that can be made of a tough and durable material such as Kevlar or spectra fiber fabrics forming an internal chamber 553 wherein individual bladders, multi-chamber bladders, or baffled bladders 550 can be installed. The internal bladders 550 can be filled with water, or other liquid, or other available materials, such as rocks, pebbles, sand, concrete bags. Once installed and filled the bladder system 500 is intended to block air flow under the saloon or deck 510 of the watercraft that would otherwise cause a lifting tendency of the watercraft. The filled bladders can also provide additional ballast or weight to increase the overall weight of the watercraft that can help prevent capsizing.

Catamarans are designed in such a way that it has a natural tendency to rise out of the water from the rear and decrease the wetted surface of the hulls. During adverse wind conditions, such as a hurricane, catamarans have a tendency to be flipped, capsized, and destroyed.

The present embodiment of the multi-hull bladder apparatus and securing method is preferably provided in a portable "kit" system, such as allowing the entire bladder apparatus to be stowed in a backpack, duffel bag, or chest. Such a portable bladder apparatus system would allow for convenient and quick portability, ready storage and carrying options, and allow the watercraft operator to transport the system within the watercraft passenger compartment or storage compartments. The ready portability and storage of the bladder apparatus system can also allow dock and port operators and owners to have reserve bladder apparatus systems available to loan, sell, or give to watercraft operators that may require the use of such systems. The ready portability of the bladder apparatus and system also allows for purchasers of the system to receive the system via ordinary parcel or freight delivery services. The portable kit system would preferably include one or more bladders; one or more removable bladder sheaths; tie down augers or stakes; tie down straps or ropes; an electric pump; a manual hand pump; and a storage backpack, duffel, or chest.

This embodiment of the multi-hull bladder apparatus and system intended to help reduce the overall damage to catamarans or other multi-hull watercraft kept on the hard (in a yard) or in a marina (in the water). Use of the multi-hull bladder apparatus and system can potentially save millions of dollars of costs in damages caused by wind storms and other adverse weather events. Another benefit provided through the described bladder system, is if fresh water is used to fill a bladder it may also be reused as a potable water source after the adverse weather event, where access to fresh water may be limited or unavailable.

It should be appreciated that the multi-hull watercraft bladder apparatus can come in various sizes and shapes to allow for the watercraft operators to use a bladder system that provides an appropriate fit for the watercraft.

Aircraft Tie Down and Bladder Apparatus and Securing Method

Typically, when aircraft are parked, chalks are used to prevent the rolling or movement of the aircraft wheels. When adverse wind conditions are forecasted by meteorological services, aircraft can either be flown away from predicted area to be affected or, if removing the aircraft from the affected area is not feasible, the aircraft can be stowed in a garage or tied down to a permanent foundation. However, with the proliferation of the sport pilot ratings and availability of light sport aircraft there has been an increase in the number of excursion type flights to unimproved airfields, events where the amount of improved parking spots with tie downs is overwhelmed or unavailable, or airfields that do not have available tie down areas for aircraft.

Figure 10A:
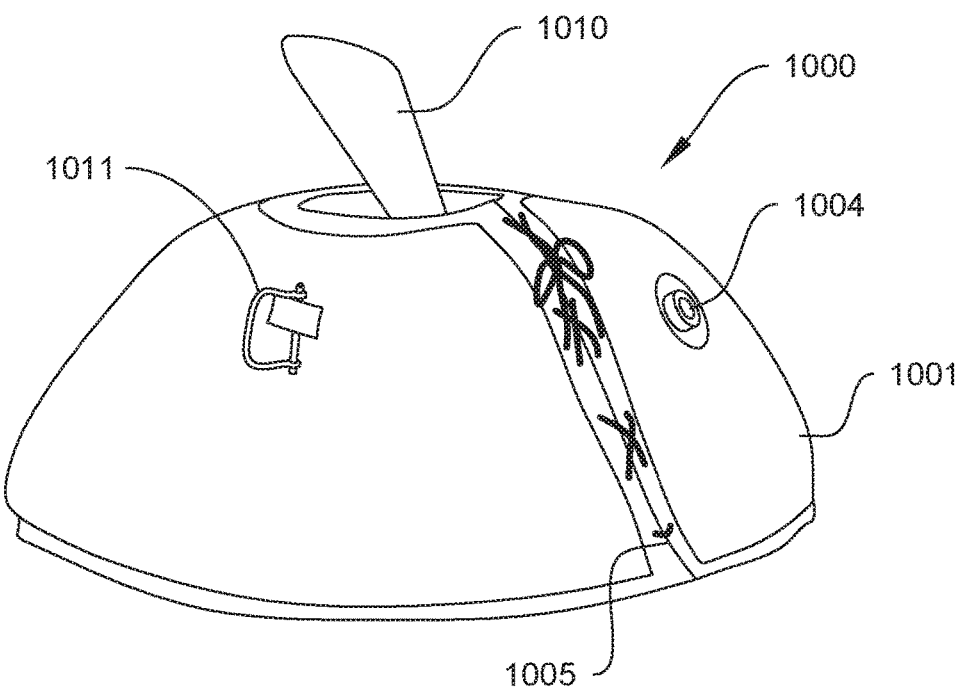
FIG. 10A is a depiction of the aircraft tie down bladder apparatus.
Figure 10B:
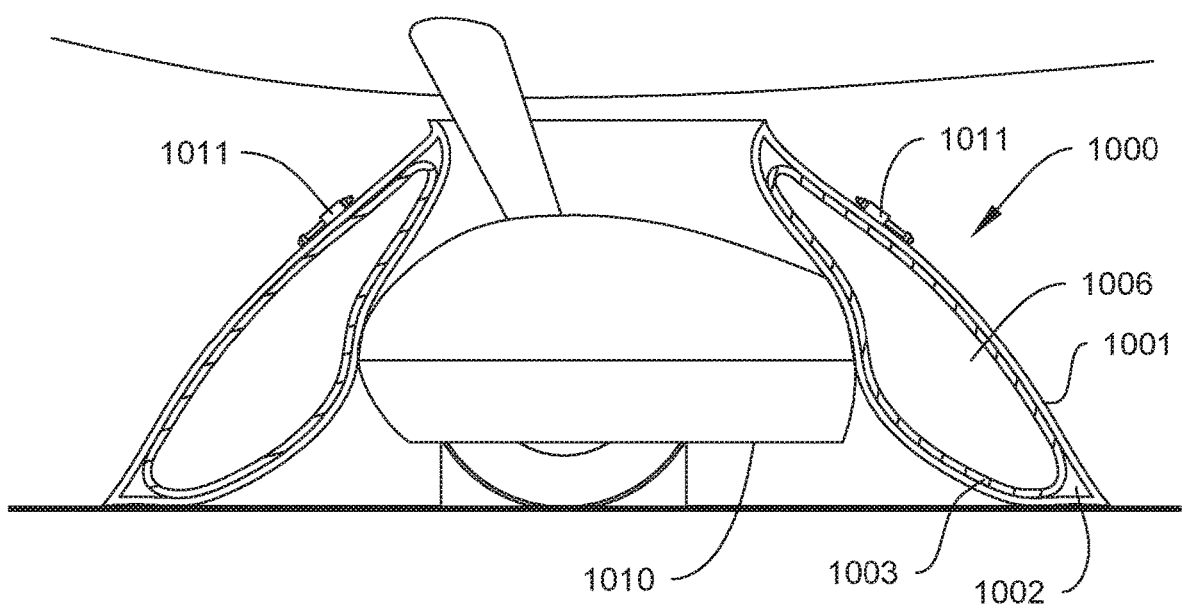
FIG. 10B is a cut-away side profile depiction of an embodiment of the aircraft tie down bladder apparatus.
Figure 11:
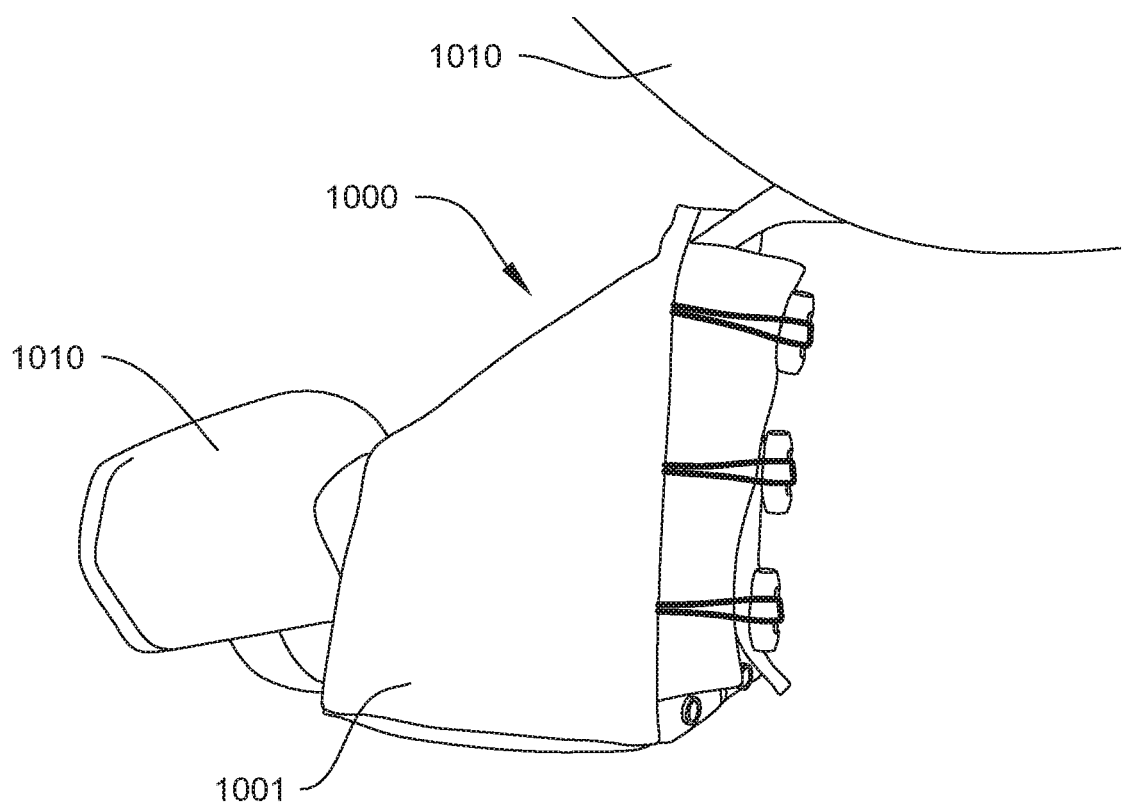
FIG. 11 is an isometric depiction of an embodiment of the aircraft tie down bladder apparatus.

With reference to FIGS. 10A, 10B, and 11, the described embodiments of the aircraft tie down and bladder apparatus allows for the aircraft operator to install the aircraft tie down bladder apparatus 1000 around the main gear of the aircraft 1010. The operator can then secure the bladder apparatus around the main gear 1010 with a fastening device 1005 such as a strap, rope, zipper, or the like. The bladder apparatus can comprise an outer sleeve or cover 1001 that can be made of a tough and durable material such as Kevlar or spectra fiber fabrics forming an internal chamber 1002 wherein individual bladders, multi-chamber bladders, or baffled bladders 1003 can be installed. The bladder 1003 preferably includes one or multiple valves or flaps 1004 to allow an opening to the interior 1006 of the bladder so that materials may be installed inside the bladder. The internal bladders can be filled with water, or other liquid, or other available materials, such as rocks, pebbles, sand, concrete bags. Once the bladder apparatus has been secured in place to the main gear 1010 and filled with additional weight, the bladder apparatus outer sleeve 1001 is further secured to the aircraft via the tie down rings 1011 to the aircraft through the use of cables, straps, or ropes. Securing the aircraft tie down rings to the bladder apparatus reduces the likelihood of movement of the aircraft during adverse wind conditions and therefore reduce the likelihood of preventable damage to the aircraft or other objects being damaged by the movement of the aircraft. FIG. 11 Alternatively, the aircraft tie down and bladder apparatus 1100 can be secured around the aircraft gear leg 1102 rather than the gear itself.

The present embodiment of the aircraft tie down bladder apparatus and securing method is preferably provided in a portable "kit" system, such as allowing the entire bladder apparatus to be stowed in a backpack, duffel bag, or chest. Such a portable bladder apparatus system would allow for convenient and quick portability, ready storage and carrying options, and allow the aircraft operator to transport the system within the aircraft passenger compartment or storage compartments. The ready portability and storage of the bladder apparatus system can also allow airfield operators and owners to have reserve bladder apparatus systems available to loan, sell, or give to aircraft operators that may require the use of such systems. The ready portability of the bladder apparatus system also allows for purchasers of the system to receive the system via ordinary parcel or freight delivery services. The portable kit system would preferably include one or more bladders; one or more removable bladder sheaths; tie down augers or stakes; tie down straps or ropes; an electric pump; a manual hand pump; and a storage backpack, duffel, or chest.

The operator can remove the system from the back pack, and place the bladders inside of the outer sleeve or cover and wrap them around the main gear with the access flap or valve still open, and zip or connect the two ends of the system together. The operator can then begin to fill the bladder with water via the provided hand or electric pump or use other material as may be necessary. Once the bladder reaches a desired level of fullness or weight, which may be specific to the weight of the airplane being secured, the operator can close the access flap or valve and seal the system with the provided zipper or other fastening device. With the provided preferred D rings affixed to the outer sleeve the operator can then use a tie down strap with one end of the tie down strap attached to the D ring and the end attached to other to the aircraft at an attachment point. If on a soft surface the tie down augers can be further utilized to secure the bladder to the earth bed below and or the attachment points on the aircraft.

The described embodiment provides an entire kit that can be used on any hard surface, as the bladder is capable of conforming to the surface upon which it is situated, and does not require tie down rings or eyelets to be permanently installed on a foundation or slab to effectively prevent unintended movement of the aircraft during adverse wind conditions.

It should be appreciated that the aircraft tie down bladder apparatus can come in various sizes and shapes to allow for aircraft operators to use a bladder that most appropriately fits their aircraft main gear or that conforms to their weight and allowance. It should be further appreciated that the tie down augers or stakes, rings or eyelets, tie down straps or ropes, or the storage bags or boxes can be of many different iterations and varieties while still within the scope of the present invention.

The invention claimed is:

1. An apparatus for securing a multi-hull watercraft by reducing lift caused by air flow between two hulls of the multi-hull watercraft, the apparatus comprising:
    an outer sleeve having an internal chamber;
    a bladder bag disposed within the internal chamber of the outer sleeve; the bladder bag having a fill valve formed on a surface of the bladder bag; and
    a first portion of the outer sleeve disposed along a first length of a first hull of the multi-hull watercraft;

a second portion of the outer sleeve disposed along a second length of a second hull of the multi-hull watercraft; and a third portion disposed between the first portion and second portion of the outer sleeve.

2. The apparatus of claim 1 further comprising:

one or more attachment devices mounted on a surface of the outer sleeve for attachment to one or more attachment points of the multi-hull watercraft.

3. The apparatus of claim 1 wherein the bladder bag further comprises internal baffling.

4. The apparatus of claim 1 wherein a plurality of bladder bags are disposed within the chamber.

5. The apparatus of claim 4 wherein the plurality of bladder bags further comprises internal baffling.

6. The apparatus of claim 1 wherein the outer sleeve further comprises a fill valve formed on the surface of the outer sleeve.

7. The apparatus of claim 1 further comprising:

the third portion being disposed between a stern end of the first portion and a stern end of the second portion.

8. The apparatus of claim 7 further comprising:

a fourth portion of the outer sleeve disposed between a fore end of the first portion and a fore end of the second portion.

9. The apparatus of claim 8 wherein the bladder bag comprises a plurality of bladder bags being disposed within the internal chamber of each of the first portion, second portion, third portion, and fourth portion of the outer sleeve.

10. The apparatus of claim 9 further comprising one or more attachment devices mounted on a surface of the outer sleeve for attachment to one or more attachment points of the multi-hull watercraft.

11. The apparatus of claim 1 further comprising a plurality of bladder bags.

12. A system comprising:

a plurality of outer sleeves each having an internal chamber, wherein the plurality of outer sleeves further comprise a valve formed on the surface of each of the outer sleeves;

wherein the plurality of outer sleeves are each disposed between a first hull and a second hull of a multi-hull watercraft forming a wind block;

a bladder bag disposed within each internal chamber of the plurality of outer sleeves, wherein the bladder bag further comprises internal baffling; the bladder bag having a valve formed on a surface of the bladder bag;

wherein the valve formed on the surface of each of the outer sleeves and the valve formed on the surface of the bladder bag are aligned allowing ingress of material into the bladder bag; and one or more attachment devices mounted on a surface of the outer sleeve.

13. A method of using a bladder apparatus for securing a multi-hull watercraft by reducing lift caused by air flow between two hulls of the multi-hull watercraft, the method comprising:

attaching an outer sleeve having an internal cavity between a first and second hull of the multi-hull watercraft via one or more attachment devices mounted on a surface of the outer sleeve to a plurality of attachment points on the multi-hull watercraft, wherein the outer sleeve forms a wind block between the first and second hull;

inserting a bladder bag into the internal cavity of the outer sleeve, the bladder bag having an internal chamber and a fill valve, the fill valve being formed on a surface of the bladder bag for allowing ingress of material into the internal chamber of the bladder bag.

14. The method of claim 13 further comprising the step of:

filling internal chamber of the bladder bag, disposed within the internal cavity of the outer sleeve, by insertion of material though a valve formed on the surface of the bladder apparatus.

15. The method of claim 14 wherein a plurality of outer sleeves having one or more bladder bags disposed within the plurality of outer sleeves are attached to the plurality of attachment points on the multi-hull watercraft.

16. The method of claim 15 wherein the material comprises water.

17. The method of claim 15 wherein the one or more bladder bags comprises internal baffling.

18. The method of claim 14 wherein the bladder bag further comprises internal baffling.

19. The method of claim 13 further comprising the step of attaching the outer sleeve so as to position a portion of the outer sleeve extending below the surface of a water level.

* * * * *